United States Patent [19]

Gorshe

[11] Patent Number: 4,868,831
[45] Date of Patent: Sep. 19, 1989

[54] ZERO BYTE TIME SLOT INTERCHANGE (ZBTSI) ENCODER

[75] Inventor: Steven S. Gorshe, Glendale, Ariz.

[73] Assignee: Siemens Transmission Systems, Inc., Phoenix, Ariz.

[21] Appl. No.: 158,002

[22] Filed: Feb. 19, 1988

[51] Int. Cl.⁴ .............................................. H04J 3/00
[52] U.S. Cl. ..................................... 371/57.2; 370/99
[58] Field of Search ....................... 371/57, 55; 370/99

[56] References Cited

U.S. PATENT DOCUMENTS

| | | | |
|---|---|---|---|
| 4,502,143 | 2/1985 | Kato et al. | 371/57 |
| 4,747,112 | 5/1988 | Blondeau, Jr. et al. | 375/20 |
| 4,757,501 | 7/1988 | Gorshe | 370/99 |
| 4,794,604 | 12/1988 | Gorshe | 371/57 |

Primary Examiner—Charles E. Atkinson
Attorney, Agent, or Firm—Jeffrey P. Morris

[57] ABSTRACT

A circuit and method for more efficiently implementing ZBTSI encoding with minimum processing delay of the ZBTSI algorithm and hardware complexity is provided in a ZBTSI encoder for use in a ZBTSI codec. The ZBTSI encoder is optimized for the ZBTSI algorithm and includes an architecture for use as an improved ZBTSI codec in application-specific integrated circuit (ASIC) technology.

12 Claims, 1 Drawing Sheet

ZBTSI ENCODER

ZERO BYTE TIME SLOT INTERCHANGE (ZBTSI) ENCODER

CROSS REFERENCE TO RELATED APPLICATION

Steven S. Gorshe, Ser. No. 067,901, filed June 30, 1987, now U.S. Pat. No. 4,794,604 issued 12-27-88, titled Optimal Error Correction Method For Zero Byte Time Slot Interchange (ZBTSI) Clear Channel Data Transmission, assigned to the same assignee as the present invention.

BACKGROUND OF THE INVENTION

1. Field of the Invention

The present invention relates generally to data encoding and transmission techniques for use in telecommunications equipment. More specifically, the present invention relates to an improved encoder for substantially reducing data error multiplication in transmission and for enabling data transmission without restriction on the quantity and sequence of logic "ones" and "zeros," such that substantially all of the information carrying cabability of a communication channel can be effectively utilized.

2. Description of the Prior Art

The Integrated Services Digital Network (ISDN) in its implementation in the North American digital telecommunications transmission network requires a full or unconstrained clear channel capability for 64-kilobit per second (Kb/sec) communication channels. The encoding technique known as Zero-Byte Time Slot Interchange (ZBTSI) is a well known technique for providing clear channel capability, also known as bit-sequence independence over DS1 transmission carrier facilities within the North American telephone network. At present, the North American telephone network limits the number of consecutive logic "zeros" that can be transmitted because the existing bipolar line code does not transmit any pulses for a logic "zero." As a result, the transmission of long strings of logic "zeros" can cause telecommunications line haul equipment such as multiplexers and protection switches to lose timing accuracy or clock recovery altogether.

As is well known, a single PCM telecommunications channel, known as a "DSO" channel, operates at 64 kilobits per second (Kb/sec) in each direction of transmission to transmit and receive 8,000 8-bit samples per second of a desired telecommunication, whether voice or data. According to the Bell standard, individual two-way channels are multiplexed into higher speed channels for long distance transmission. As a particular example, 24 8-bit samples, one from each DSO channel, are arranged serially in a single transmission frame together with a single framing bit to form a 193-bit frame.

Transmission of successive 193-bit frames at a rate of 8,000 frames per second determines the bit rate of 1.544 Mb/sec. Set forth in the following table are some of the Bell standard digital transmission lines or hierarchical levels with their associated transmission rates and numbers of channels:

TABLE 1

| Transmission Line | Number of Voice Channels | Transmission Rate |
|---|---|---|
| DS0 | 1 | 64 Kb/sec. |
| DS1 | 24 | Approx. 1.5 Mb/sec. |
| DS1C | 48 | Approx. 3 Mb/sec. |
| DS2 | 96 | Approx. 6 Mb/sec. |
| DS3 | 672 | Approx. 45 Mb/sec. |

TABLE 1-continued

The standard for digital carrier multiplexers operating to multiplex digital DS1, DS1C and DS2 T carrier transmission lines into a DS3 transmission line is set forth and discussed in the *Bell System Transmission Engineering Technical Reference* entitled "Digital Multiplexes, Requirements and Objectives" by the Director, Exchange Systems Design, AT&T (July, 1982). Digital multiplexers which are connected into the Bell System pulse code modulated T carrier telecommunications network must conform with this standard.

The present North American digital network cannot directly accommodate clear channel capability because of the minimum pulse density restrictions for 1.544 Mb/s DS1 signals and 3.152 Mb/s DS1C requires an average of at least one pulse in eight pulse positions and no more than 15 pulse positions without a pulse. The clock recovery circuit of these repeaters and the receive section of channel banks and other source/sink devices will lose timing accuracy, or timing altogether, in the presence of low logic "ones" density or long strings of logic "zeros." T1C-type repeaters have a similar restriction of at least a ⅓ pulse density over any 150 consecutive pulse positions.

To satisfy the clock recovery requirements of repeaters and source/sink devices, several design techniques are used to guarantee that devices originating DS1 and DS1C signals do not exceed the aforementioned pulse density constraints. In order to properly encode the highest analog frequency of a voice channel, the sampling rate has been established at 8000 samples per second. This sampling rate is also the frame rate for the DS1 signal. Each sample is encoded into an eight-bit word, which permits the dynamic range of the human voice to be mapped over 256 discrete steps in amplitude. With 8000 samples are per second times 8 bits per sample, the result is 64 Kb/s for each of the individual DSO channels. It is apparent that only the all-zero byte need be restricted, which would offer the ratio 255/256 efficiency, or 99.6 percent of the 64 kb/s channel, as unconstrained information bits for channel users. Unfortunately, existing source/sink devices are not nearly this efficient.

Analog voice signals with associated signaling are coded into the 64 Kb/s channels using a combination of robbed-bit signaling and zero code suppression to guarantee the presence of at least one logic "one" in each byte. For digital data channels, a different technique is employed to ensure that the proper "ones" density is maintained. During transmission of customer digital data, a designated control bit is forced to a logic "one" on a full-time basis. Since the sampling rate remains at 8000 samples per second and there are now only 7 bits per sample available to the channel users, the effective unconstrained information rate to the channel user reduces to 56 Kb/s.

All of the source/sink designs which do not provide for clear channel capability employ at least one of the aforementioned techniques, which reduce the available information bits in the 64 Kb/s channels.

This includes virtually all source/sink devices currently in use in the North American telecommunications network. With the advent of ISDN, some scheme of restoring user access to the full 64 Kb/s channel without restriction on the quantity and sequence of ones and zeros is required. The same requirement exists for all remaining ISDN primary-rate interfaces. The provisioning of clear channel capability requires that new source/sink devices such as PCM terminals allow unconstrained primary-rate digital signals to enter and leave the network intact, and also continue to maintain the minimum pulse density requirements toward line-haul elements. Line-haul elements include repeaters, multiplexers, and automatic protection switches. To this extent, the North American network is not operating with clear channel capability with any of the known prior art techniques currently operational. The clear channel capability function is actually a synthesized condition, converting the clear channel signal to a form which can be transported by the line-haul network elements, then back to the original signal at the far-end source/sink device.

ZBTSI is a known format which allows continued use of a bipolar line code, i.e., an AMI line code, but which does not require any changes to existing telecommunications line haul equipment or to the operation, administration, maintenance and provisioning procedures associated therewith. The first ZBTSI implementation was introduced in 1983 for use in point-to-point nonswitched connections between customer premises equipment locations.

The ZBTSI algorithm operates on contiguous 8-bit channels which correspond in location to the DSO channels and are referred to here as "octets". Each octet is examined in conjunction with the two octets that are adjacent to it. If an octet contains eight logic "zeros" and combine with the adjacent octets to violate the DS1 ones density criteria, then it is processed as a violating All-Zero Octet (VAZO). Specifically, the all-zero octet will be declared a VAZO if it combines with its adjacent octets to form a zero-string of 15 zeros or longer, or if either of the adjacent octets contains less than two logic "ones." The octets are processed in groups of 96 and are aligned with the DS1 extended superframe (ESF) format superframe. A flag bit is carried in the frame-bit data link of the ESF format and each flag bit is associated with a 96-octet group. The flag-bit indicates whether a VAZO was found in that 96-octet group. An address chain is constructed using octet 96 and the VAZO locations which allows the VAZOs to be identified at the ZBTSI decoder. As a result of the encoding process, the octets adjacent to every VAZO form a signature around the VAZO.

SUMMARY OF THE INVENTION

A circuit and method for more efficiently implementing ZBTSI encoding with minimum processing delay of the ZBTSI algorithm and hardware complexity is provided in a ZBTSI encoder for use in a ZBTSI codec. The ZBTSI encoder is optimized for the ZBTSI algorithm and includes an architecture for use as an improved ZBTSI codec in application-specific integrated circuit (ASIC) technology.

It is therefore a primary object of the present invention, to provide a novel ZBTSI encoder in a hardware configuration which is optimized to require a minimum of processing delay and data storage, without complex circuitry.

Another object of the present invention is to provide an improved ZBTSI codec.

Yet another object of the present invention is to provide a novel ZBTSI encoder for implementation in ASIC technology.

Other objects and advantages of the present invention will become apparent with reference to the accompanying drawings and detailed description thereof, wherein:

DESCRIPTION OF THE PREFERRED EMBODIMENT

Figure 1:
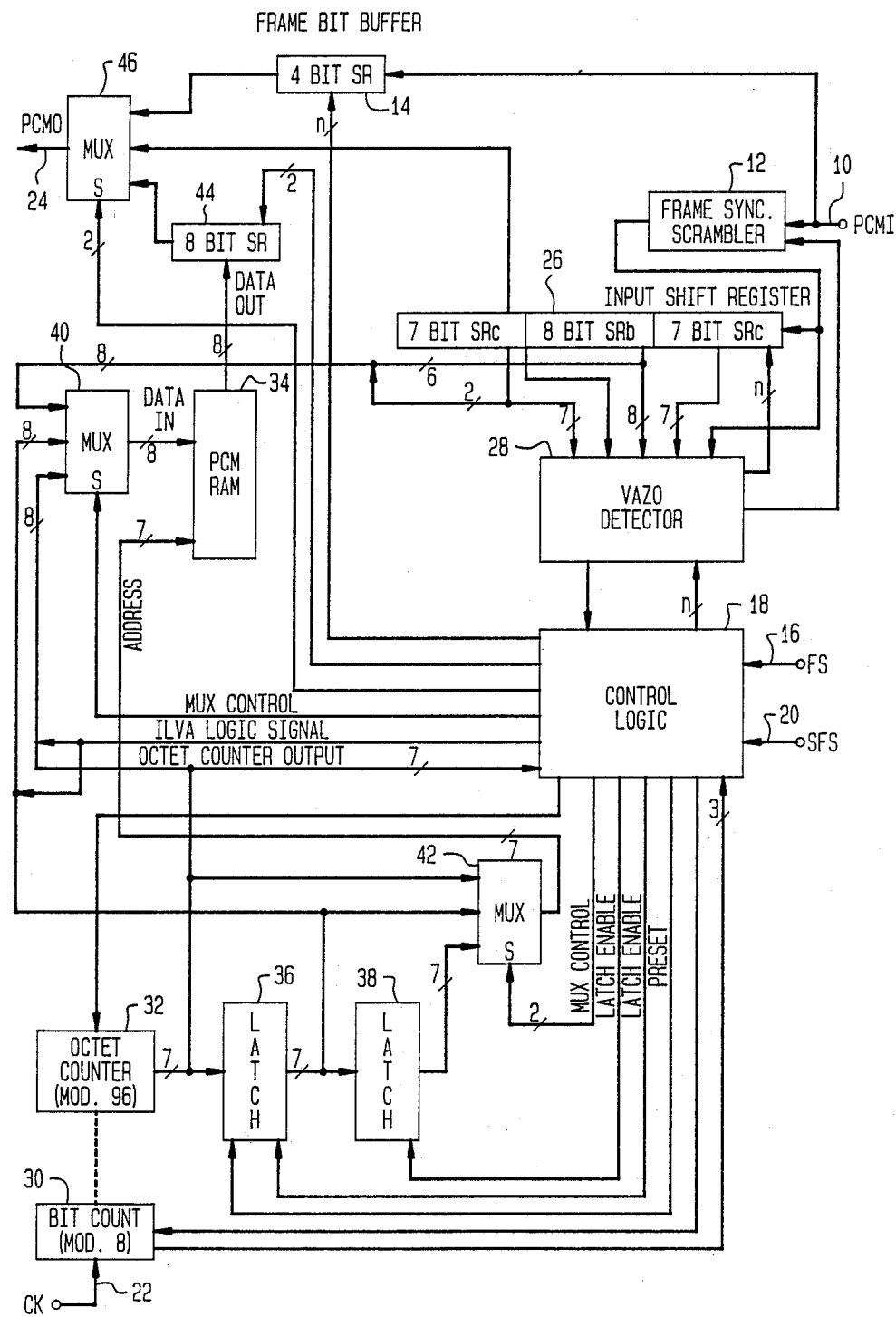
FIG. 1 is a block diagram of a ZBTSI encoder in accordance with the present invention.

The Zero Byte Time Slot Interchange (ZBTSI) algorithm is described in detail in the aforementioned cross-referenced U.S. Pat. No. 4,794,604 to applicant and reference is made thereto also for circuit details of ZBTSI decoder, error detector, counter and control logic circuitry with which the encoder of the present invention may be utilized. As described in the aforementioned cross-referenced application, the ZBTSI algorithm performs its processing at a logic level rather than operating directly on the final line code, and treats each DS1 frame as comprised of 24 8-bit channels plus a framing bit in the first bit position. The channelization of the data within the frame is independent of the ZBTSI algorithm. The ZBTSI encoder operates on blocks of 96 8-bit channels, which is four DS1 frames. Each 8-bit channel is called an octet and the ZBTSI algorithm numbers them from 01 to 96. A ZBTSI processing indicator flag bit, the Z-bit, is associated with each 96-octet group and is transmitted at the beginning of each 96-octet group. The Z-bit is carried in 2 kb/s of the extended superframe (ESF) frame bit data link. The assignment of frame bits (F-bits) in the ESF with ZBTSI encoding is shown in the table below where:

FPS is the Framing Pattern Sequence
FDL is the Frame Data Link (message bits m)
ZBTSI is ZBTSI encoding flag bits (Z-bits)
CRC is Cyclic Redundancy Check

TABLE 2

| FRAME BIT DEFINITIONS | | | | | |
|---|---|---|---|---|---|
| FRAME No. | BIT NO. | FPS | FDL | ZBTSI | CRC |
| 1 | 0 | — | — | Z | — |
| 2 | 193 | — | — | — | C1 |
| 3 | 386 | — | m | — | — |
| 4 | 579 | 0 | — | — | — |
| 5 | 772 | — | — | Z | — |
| 6 | 965 | — | — | — | C2 |
| 7 | 1158 | — | m | — | — |
| 8 | 1351 | 0 | — | — | — |
| 9 | 1544 | — | — | Z | — |
| 10 | 1737 | — | — | — | C3 |
| 11 | 1930 | — | m | — | — |
| 12 | 2123 | 1 | — | — | — |
| 13 | 2316 | — | — | Z | — |
| 14 | 2509 | — | — | — | C4 |
| 15 | 2702 | — | m | — | — |
| 16 | 2895 | 0 | — | — | — |
| 17 | 3088 | — | — | Z | — |
| 18 | 3281 | — | — | — | C5 |
| 19 | 3474 | — | m | — | — |
| 20 | 3667 | 1 | — | — | — |
| 21 | 3860 | — | — | — | — |
| 22 | 4053 | — | — | — | C6 |
| 23 | 4246 | — | m | — | — |
| 24 | 4439 | 1 | — | — | — |

The basic principle of the ZBTSI algorithm can be summarized as follows. The PCM data, except for the F-bits, is scrambled by a frame-synchronized scrambler as it enters the ZBTSI encoder and is descrambled as it exits the ZBTSI decoder. First, the data is searched on an octet-by-octet basis in order to determine whether the DS1 maximum zero string or minimum ones density requirements is violated. If either of the aforementioned requirements is violated, an address chain is constructed to locate all of the all-zero octets involved. The addresses are then inserted into the locations of the all-zero octets. One of the octets, octet 96, is displaced in order to provide a constant storage location for the first address. The original value of octet 96 is stored in the location of the last all-zero octet. The final step of the ZBTSI encoding process is to set the Z-bit to the appropriate value. The ZBTSI decoder simply reverses the process performed at the encoder. The decoder may also perform partial error detection and correction. Scrambling in telecommunication data transmission is well known, and reference can be made for detailed descriptions of such scramblers, by way of example, to U.S. Pat. No. 3,649,915; Digital Data Scrambler—Descrambler Apparatus for Improved Error Performance. The ESF cyclic redundancy check is calculated before the ZBTSI encoder stage at a DS1 signal source and is calculated after the ZBTSI decoder at a DS1 sink device.

The aforementioned ZBTSI algorithm provides bit-sequence independence eg. clear channel capability in T1 type digital telephone transmission networks by manipulating the PCM data to ensure that the minimum pulse density requirements for T1 type transmission is met.

The basic function of a ZBTSI encoder is to scramble the incoming data, scan the scrambled data for violating zero strings, and remove those zero strings by constructing an address chain of the zero-byte locations and inserting that address chain into the zero-byte locations. A bit in the extended superframe (ESF) format frame-bit data link is set to indicate whether zero bytes were found and processed by the encoder. Specifically, the data is processed in blocks of 96 bytes or octets which are numbered sequencially from 1 to 96 in the order in which they are received. The term "octet" here is used to refer to an 8-bit word which corresponds in bit alignment to the location of a DS0 channel. If no violating all-zero octets (VAZOs) are found in the 96 octet group, Octet 96 will be transmitted first with the remaining octets transmitted in order from Octet 1 to Octet 95. Octet 96 is displaced whenever a VAZO is found in the 96 octet data group. The normal position of Octet 96 now contains the address of the first VAZO location. If multiple VAZOs are found, then the first VAZO location will contain the address of the second VAZO location, the second VAZO location will contain the address of the third location, and etc. The data from Octet 96 is now contained within the location of the last VAZO in the 96 octet group. One of the bits in the VAZO address field, serves as the Indicator of the Last VAZO Address (ILVA) and is used by the decoder to determine the end of the address chain.

Referring now to FIG. 1, a ZBTSI encoder in accordance with the present invention is illustrated. A unipolar input 1.544 Mb/s DS1 PCM serial data stream including framing bits is coupled on line 10 as (PCMI) to a frame sync scrambler 12 and a frame bit buffer implemented as a 4 bit shift register 14. A frame bit reference signal (FS) is coupled as another input on line 16 to control logic 18. A superframe boundary reference signal (SFS) is also coupled to control logic 18 via line 20 and a 1.544 KHz data clock (CK) on line 22 is input to the encoder. The aforementioned signal inputs are examples of the typical outputs from DS1-ESF framing recovery circuits. As will be explained hereinafter, the output of the ZBTSI encoder is a unipolar 1.544 Mb/s DS1 PCM serial data stream with ZBTSI encoding (PCMO) on line 24.

The input PCM data PCMI on line 10 is coupled through the scrambler 12 into a 23-bit input shift register 26. Output taps from the shift register 26 enable the VAZO detection circuit 28 to search the incoming PCMI data for VAZO's. The decision regarding a given octet is made when the octet is positioned in the second eight bits of shift register 26. At this time, seven bits of the octets adjacent to the given octet are also contained within shift register 26, as shown.

The bit counter 30, clocked by the 1.544 KH$_3$ data clock (CK) and the octet counter 32 in combination provide all information necessary in the ZBTSI encoder pertaining to the position of octets within the input shift register and the position of these octets within the DS1 superframe, and hence within the 96-octet ZBTSI group. The counters 30 and 32 are set periodically by signals generated from the FS and SFS signals to inforce correct alignment. The binary value of the octet counter 32 state at a given time is equal to the octet number of the octet which is nominally in the center of the input shift register 26. The control logic 18 uses the outputs of the VAZO detector 28, the modulo-8 bit counter 30, the octet counter 32 and the FS and SFS signals to generate the appropriate timing and control signals for the encoder.

The PCM RAM 34 provides the buffer for the 96 octets of the group. A given octet from the previous 96-octet group is read from the RAM 34 immediately before the octet with the same octet number in the current group is written to that location. The ZBTSI address chain is formed by modifying the data in the RAM 34 as described below.

Latch 36 is preset at the beginning of each 96-octet group so that it contains a binary address of "96". When a VAZO is detected, the address of that octet is stored in latch 36 and the previous contents of latch 36 are transferred to latch 38. Multiplexers 40 and 42 and latches 36 and 38 are used to construct the address chain.

There are five operational possibilities that can occur. Each case will now be considered.

CASE 1: Only a single VAZO is found in a particular 96-octet group and that VAZO is not Octet 96.

When the VAZO is found, the address of the VAZO is written to the Octet 96 of the PCM RAM 34 location by selecting the contents of latch 36 for the RAM address and the output of the octet counter 32 plus the ILVA signal for the RAM 34 data input. Multiplexers 42 and 40 are used for the RAM 34 address and data input selection, respectively. After the first VAZO address ia written to the octet 96 location, the contents of latch 36 are shifted to latch 38 and the output of the octet counter 32 are latched into latch 36. When the octet counter 32 reaches a value of "96", signifying the end of the group, the data values of Octet 96 are written to the PCM RAM location of the VAZO by selecting the contents of latch 36 for the RAM address and the data from input shift register 26 for the data input. The ILVA bit must now be set to indicate that the first VAZO address is also the last one. This operation is performed by writing to the Octet 96 location a second time with the address of the first VAZO and the ILVA logic set to a "1". At this time latch 36 contains the address of the VAZO and latch 38 contains the value of "96" to which latch 36 was preset at the beginning of the group, so latch 36 provides the data and latch 38 provides the address for the write operation to set the ILVA bit.

CASE 2: Octet 96 is the only VAZO in the 96-octet group.

When Octet 96 is the only VAZO, it is the only octet which requires modification. For timing simplification, this modification may be performed in the output shift register 44. Output shift register 44 normally receives its data as a parallel load from the PCM RAM 34 with the octet counter 32 always supplying the address for the read operation from the RAM. For this Case 2, a signal from the control logic 18 during the read operation for Octet 96 will cause the output shift register 44 to preset to a value of "11100000", which represents the appropriate binary address of "96" with an ILVA value of "1", instead of receiving its data from the RAM 34.

CASE 3: Multiple VAZOs are found in the 96-octet group and Octet 96 is not a VAZO.

When the first VAZO is found, the address of the VAZO is written to the Octet 96 location in the PCM RAM 34 by selecting the contents of latch 36 for the RAM address and the output of the octet counter 32 plus the ILVA signal for the RAM 34 data input. The ILVA logic will have a value of "0" unless the end of the 96-octet group has been reached. The contents of latch 36 are then shifted to latch 38 and the output of the octet counter 32 is then latched into latch 36. When the second VAZO is found, the address of the second VAZO is written to the RAM address location of the first VAZO. As above, the address of the first VAZO location is stored in latch 36 and the address of the current (second) VAZO is the output of the octet counter 32. As before, the contents of latch 36 are then shifted to latch 38 and the output of the octet counter 32 is then latched into latch 36. If a third VAZO is found, its address is written into the previous VAZO RAM 34 address location, the contents of latch 36 are shifted to latch 38, and the output of the octet counter is latched into latch 36. This process repeats with each additional VAZO until the last VAZO in the 96-octet group is found. As with Case 1, the ILVA bit must be set to a value of "1" in the octet that contains the address of the last VAZO In the group. This operation is performed by writing the contents of latch 36 to the address contained in latch 38 with the ILVA logic set to a value of "1". The data values of Octet 96, which are found in shift register 26, are written at this time to the RAM 34 address location of the last VAZO, the address of which is stored in latch 36.

CASE 4: Multiple VAZOs are found and Octet 96 is one of the VAZOs.

The processing of the VAZOs proceeds exactly as described in Case 3 until the end of the 96-octet group is found. The address of Octet 96, which is the output of the octet counter 32, is written to the RAM 34 address location of the previous VAZO, the address of which is found in latch 36. The ILVA logic during this write operation is set to a value of "1". Since the ILVA bits are already set to the correct values, the second write operation described above in Cases 1 and 3 is not necessary.

Case 5: No VAZOs are found.

If no VAZOs are found, the PCM RAM 34 always uses the output of the octet counter as its address input and the parallel output from the input shift register 26 as the data input. When the end of the 96-octet group is reached, the values of Octet 96 are passed directly to an output multiplexer 46 instead of writing them to the PCM RAM 34 and reading them back to the output shift register 44. This treatment minimizes processing delay.

The output PCM signal receives its final reconstruction from the output multiplexer 46. The frame-bits are stripped from the PCM data stream and are buffered in the F-bit Shift Register 14 for four DS1 frames. In this way, the frame-bits receive the same amount of delay as the PCM data. The flag bit in the ESF-DS1 frame bit data link which indicates whether ZBTSI processing occurs is set to the appropriate value before it leaves the F-bit Shift Register 14.

While the present invention has been described in connection with a preferred embodiment thereof, it is to be understood that additional embodiments, modifications and applications which will become apparent to those skilled in the art are included within the spirit and scope of the invention as set forth in the claims appended hereto.

I claim:

1. A ZBTSI encoder comprising:
   frame synchronization means for receiving an input PCM serial data stream including framing bits, and for deriving an output signal;
   shift register means for receiving said output signal from said frame synchronization means such that a current octet and two adjacent octets are temporarily stored therein;
   VAZO detector means coupled to a plurality of output taps from said shift register means to detect whether said current octet is a VAZO octet; and having an output;
   RAM means for storing all of the octets of a prior group of 96 octets, each of said octets in said group having an address in the RAM and each of said octets of said prior group of 96 octets being coupled to said RAM from a latching circuit means when an octet having a VAZO is detected;
   counter means for providing information which, together with the output of said VAZO detector means, identifies the position of octets within said shift register and within a 96-octet ZBTSI group to a control logic means;
   said control logic means for providing timing signals for said encoder;
   wherein said latching circuit includes means for storing the address of a detected VAZO octet and for coupling out a previous octet in its place for storage in said RAM; and
   multiplexer means coupled to the output of said RAM means and said shift register means for generating an output unipolar PCM serial data stream with ZBTSI encoding.

2. A ZBTSI encoder in accordance with claim 1:
   wherein said input PCM serial data stream is a unipolar DS1 signal.

3. A ZBTSI encoder in accordance with claim 1 wherein:
   said means for deriving information to identify the position of octets within said shift register and within said 96-octet group comprises:
   bit counter means set by framing information;

a data clock; and octet counter means for deriving a binary value equal to the octet number of the octet which is in the center of said input shift register means.

4. A ZBTSI encoder in accordance with claim 3 wherein said bit counter means is a modulo-8 counter.

5. A ZBTSI encoder in accordance with claim 3 wherein said framing information coupled to said bit counter and to said octet counter means includes frame and superframe signals for correct alignment with said framing information.

6. A ZBTSI encoder in accordance with claim 1 wherein said shift register means is a 23-bit shift register.

7. A ZBTSI encoder in accordance with claim 1 wherein a ZBTSI address chain is formed in said RAM by modifying the 96 octets of data stored in said RAM.

8. A ZBTSI encoder in accordance with claim 1 wherein said latching circuit includes: first and second latching means whereby the address of a VAZO octet is stored in said first latching means, and the previous contents of said first latching means are transferred to said second latching means, whereby the contents of said second latching means are coupled out.

9. A ZBTSI encoder in accordance with claim 8 wherein said first latching means is preset at the beginning of each 96-octet group to contain the binary address of 96.

10. A ZBTSI encoder in accordance with claim 1 wherein said multiplexer means provides a final reconstruction of said PCM output data stream.

11. A ZBTSI encoder in accordance with claim 10 wherein said reconstruction of said PCM output data stream occurs in said multiplexer means such that when the end of a 96-octet group is reached, data is coupled directly to said multiplexer, whereby said data is not written into said RAM, and processing delay is minimized.

12. A ZBTSI encoder in accordance with claim 11 further including:

means for stripping frame bits from said output PCM data stream, whereby said frame bits are delayed the same amount as said PCM data.

* * * * *